Dec. 22, 1942.  G. FARINA  2,305,764

MASTER CYLINDER FOR HYDRAULIC BRAKES

Filed Nov. 25, 1940

Inventor
Giovanni Farina
by Sommers + Young
Attorneys

UNITED STATES PATENT OFFICE 2,305,764

MASTER CYLINDER FOR HYDRAULIC BRAKES

Giovanni Farina, Turin, Italy; vested in the Alien Property Custodian

Application November 25, 1940, Serial No. 367,132
In Italy November 27, 1939

6 Claims. (Cl. 60—54.6)

This invention relates to improvements in the master cylinder of hydraulic brakes.

An object of this invention is to provide a tumbler-shaped piston having on its front face a packing of rubber or other elastic material in the form of a ring of U-shaped section, adapted to insure a tight joint not only against the inner surface of the cylinder body, but also against the outer surface of a tubular core arranged in the axial direction of the cylinder.

The tubular core extends to the outside of the cylinder and is provided on its projecting portion with a connection with a liquid reservoir not shown, for instance with the pressure feeder described in my Patent No. 2,077,748 dated April 20, 1937. The cylinder inside freely communicates at its front end through a connection and pipe with the cylinders of the vehicle brakes.

Constant communication between the liquid reservoir and the inside of the master cylinder in the inoperative position of the piston is established by holes bored in the tubular core.

This affords a number of novel important advantages over previous master cylinders in which said holes or ports establishing communication with the liquid reservoir are bored in the cylinder surface.

In fact, it is no longer necessary to provide liquid sealing members at the rear portion of the piston, as are required in cylinders known heretofore, in which on the forward movement of the piston for actuating the brakes the holes get past the piston packing. By my system, during operation of the piston no liquid can escape through the holes, as the piston is of tumbler-shape and no communication with the outside may take place, while any liquid penetrating between the core and piston inside would flow back into the recess of the core which communicates with the reservoir.

It is possible to flare the holes and round the edges of said holes formed on the outer surface of the core, which avoids the danger of injuries to the packing edge when it slides thereon during operation of the piston. In existing master cylinders it is not possible to flare the holes and round the edges on the inner surface of the cylinder, while this operation may be easily carried out on an outer surface as that of the tubular core of this arrangement.

It is possible to maintain the edge of the annular piston packing tangential to the holes when the piston is in its inoperative position, so that while the holes are totally free in this piston position, they are promptly covered as soon as the piston starts its compression stroke. This can be effected in a very simple manner in the master cylinder according to this invention, as it is sufficient to axially displace the perforated core, thereby adjusting the position of the holes with respect to the packing edge.

Further features of this master cylinder will appear from the description which follows in which reference is made to the drawing, showing by way of example a construction of this mechanism.

I denotes the cylinder in which moves the tumbler-shaped piston 2. 4 denotes a tubular core arranged along the cylinder axis, on which the tumbler piston 2 moves. The core 4 extends to the outside of the cylinder and ends by a connection 5 for communication with an oil reservoir 10, which may be for instance the pressure feeder described in my above mentioned patent.

Figure 1:
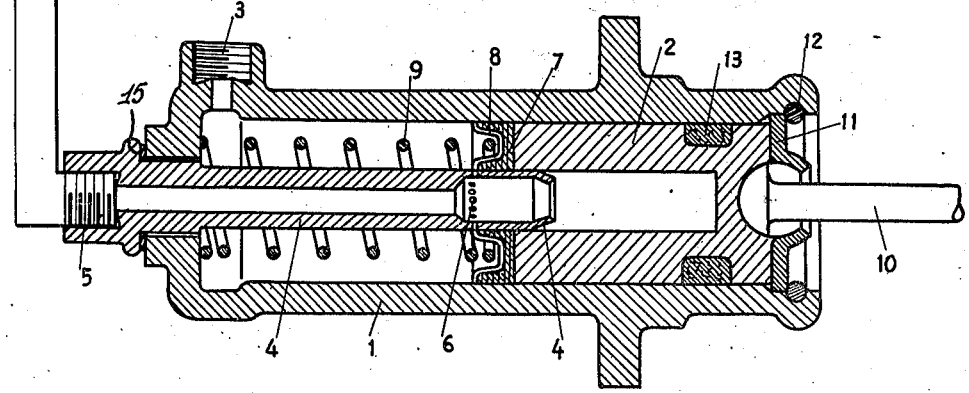
Figure 1 is an axial section of the master cylinder.
Figure 2:
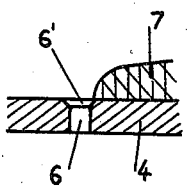
Figure 2 is a detail view.

The chamber of the cylinder I is formed at its lower end with a hole and carries a connection 3 to the pipe extending to the brake cylinders. The hole 2 is not controlled by any valve, so that the inside of the master cylinder freely and constantly communicates with the brake cylinders. 6 indicates a row of holes bored in a region of a reduced thickness of the tubular core 4, which are tangential to the edge of the annular packing 7 of U-shaped section of the piston when the latter is in its withdrawn inoperative position shown in Figure 1. 8 denotes an annular shallow disc also of U-shaped section, acted upon by the spring 9 returning the piston 2. The piston is operated as usual by a rod 10 actuated by the vehicle brake pedal, and the cylinder is closed at its rear end by a cover 11, which is held in position simply by an expansible ring 12. The cover 11 has its central hole shaped in such manner as to act as a stop against loosening of the rod 10. As shown in Figure 2, the holes 6 are flared on the outer side of the tubular core 4, so as to form on this side instead of a sharp edge a rounded edge 6' which prevents injury of the edge of the packing 7 as it moves over the holes during the initial brake actuating stroke. The correct position of the holes 6 with respect to the edge of the packing 7 is determined by adjusting the axial position of said tubular core 4, for instance by arranging a washer 15 of greater or smaller thickness between the outer head of the core and the bottom of the cylinder.

The front end 4' of the tubular core is conical or otherwise tapered, as shown in the drawing, in order to facilitate engagement of said core into the hole of the annular packing 7 during assembly. In view of the tumbler shape of the piston 3, closed at its bottom, and on account of the fact that the holes 6 are bored in the tubular core instead of in the cylinder wall as usual, no rear packing is required for the piston in order to prevent filtering of oil to the outside, when the packing 7 has moved beyond the holes during the brake applying stroke.

According to this invention, the tumbler-shaped piston 2 may be simply formed with an annular groove filled with fibrous material 13 impregnated with oil, having the only function of maintaining the surfaces of the cylinder 1 and piston greased.

As mentioned above, the characteristic feature of the invention affords a safe and perfect operation of the front packing of the piston, avoiding injury thereof on moving over the holes communicating with the oil feeder, even when the packing is pushed against the holes by a considerable pressure, as when a servo-mechanism is employed for actuating the brakes.

What I claim is:

1. In combination with a master cylinder for hydraulic brakes, a fluid reservoir, a tubular body connected with said reservoir and extending axially within said cylinder and having at its inner end an annular row of small radial holes and a tumbler-shaped piston of which the outer surface tightly moves on the inner cylinder wall, while the inner surface of the piston moves on said tubular body, said small holes being uncovered by said piston when the latter is in its inoperative position.

2. In combination with a master cylinder for hydraulic operating mechanisms, a fluid reservoir, a tubular body connected with said reservoir and extending axially within said cylinder and having at its inner end an annular row of small radial holes, a tumbler-shaped piston of which the outer surface moves over the inner cylinder wall, while the inner surface moves over said tubular body, an annular packing of C-shaped section applied against the front end of said piston for ensuring a tight joint between the piston, cylinder and tubular body, said small holes being uncovered by the free edge of the packing when the piston is in its inoperative position.

3. Cylinder as claimed in claim 2, in which the tubular body may be adjusted by hand in an axial direction with respect to the cylinder so that the row of said holes may be constantly maintained tangential to the edge of the piston packing.

4. Cylinder as claimed in claim 2, in which the inner end of the tubular body is conical in order to facilitate assembly in the hole of the piston packing.

5. Cylinder, as claimed in claim 2, in which the small holes are flared and their edge on the outside of the tubular body is rounded.

6. In combination with a master cylinder for hydraulic operating mechanisms, a fluid reservoir, a tubular body connected with said reservoir and extending axially within said cylinder and having at its inner end an annular row of small radial holes, a tumbler-shaped piston of which the outer surface moves over the inner cylinder wall, while the inner surface moves over said tubular body, an annular packing of C-shaped section applied against the front end of said piston for ensuring a tight joint between the piston, cylinder and tubular body, said small holes being uncovered by the free edge of the packing when the piston is in its inoperative position, a cover closing the rear end of said cylinder and an expansible ring for holding said cover in position.

GIOVANNI FARINA.